(12) United States Patent
Touray et al.

(10) Patent No.: US 8,839,378 B2
(45) Date of Patent: *Sep. 16, 2014

(54) INTERWORKING BETWEEN FIRST AND SECOND AUTHENTICATION DOMAINS

(71) Applicant: Apple Inc., Cupertino, CA (US)

(72) Inventors: Yusupha Touray, Kanata (CA); Fayaz Kadri, Kanata (CA); David Anderson, Calgary (CA)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/745,042

(22) Filed: Jan. 18, 2013

(65) Prior Publication Data

US 2013/0133047 A1  May 23, 2013

Related U.S. Application Data

(63) Continuation of application No. 12/006,186, filed on Dec. 31, 2007, now Pat. No. 8,429,719.

(60) Provisional application No. 60/885,935, filed on Jan. 22, 2007.

(51) Int. Cl.
*H04L 12/28* (2006.01)
*H04L 29/06* (2006.01)
*G06F 12/00* (2006.01)
*H04W 12/06* (2009.01)

(52) U.S. Cl.
CPC ............ *H04L 63/06* (2013.01); *H04L 63/0892* (2013.01); *H04L 63/0884* (2013.01); *H04W 12/06* (2013.01)
USPC ................... 726/4; 370/229; 370/230; 726/5; 726/18; 726/19

(58) Field of Classification Search
None
See application file for complete search history.

(56) References Cited

U.S. PATENT DOCUMENTS

| 7,561,692 | B2 | 7/2009 | Altshuller et al. | |
|---|---|---|---|---|
| 2003/0233546 | A1* | 12/2003 | Blom | 713/168 |
| 2006/0182061 | A1* | 8/2006 | Naghian | 370/331 |
| 2007/0019623 | A1 | 1/2007 | Alt et al. | |
| 2007/0208864 | A1 | 9/2007 | Flynn et al. | |
| 2008/0062985 | A1 | 3/2008 | Agarwal et al. | |
| 2008/0108322 | A1* | 5/2008 | Upp | 455/411 |

FOREIGN PATENT DOCUMENTS

| WO | 98/47270 | 10/1998 |
|---|---|---|
| WO | 2006/020997 | 2/2006 |
| WO | 2006/087616 | 8/2006 |

OTHER PUBLICATIONS

Search Report in EP Application No. 07874560.1-2413/ 2127401, issued Nov. 26, 2012, pp. 1-5.
Canadian Patent Office, International Search Report and Written Opinion for International Application No. PCT/IB2007/004659, 9 pages, Feb. 9, 2009.
Khan et al., "Authentication in Multi-Hop Wireless Mesh Networks," World Academy of Science, Engineering, and Technology vol. 16, 6 pages, Nov. 2006.

* cited by examiner

*Primary Examiner* — Fatoumata Traore
(74) *Attorney, Agent, or Firm* — Meyertons, Hood, Kivlin, Kowert & Goetzel, P.C.

(57) ABSTRACT

To interwork between a first authentication domain and a second authentication domain, a bridge module performs a first authentication procedure in the first authentication domain for a mobile station, wherein the first authentication domain is part of a wireless access network. Based on information collected in the first authentication procedure, the bridge module performs a second authentication procedure is performed, on behalf of the mobile station, in the second authentication domain.

21 Claims, 2 Drawing Sheets

US 8,839,378 B2

INTERWORKING BETWEEN FIRST AND SECOND AUTHENTICATION DOMAINS

CROSS-REFERENCE TO RELATED APPLICATIONS

This application is a continuation of U.S. patent application Ser. No. 12/006,186, filed Dec. 31, 2007, entitled "Interworking Between First and Second Authentication Domains", which claims benefit of U.S. Provisional Patent Application Serial No. 60/885,935 filed Jan. 22, 2007, both of which are incorporated herein by reference as if set forth their entirety.

TECHNICAL FIELD

The invention relates generally to interworking between first and second authentication domains.

BACKGROUND

Various wireless access technologies have been proposed or implemented to enable mobile stations to perform communications with other mobile stations or with wired terminals coupled to wired networks. More recently, a wireless broadband access technology that has been defined is the Worldwide Interoperability for Microwave Access (WiMax) technology, which is based on the IEEE (Institute of Electrical and Electronics Engineers) 802.16 Standard (as amended by the IEEE 802.16e or IEEE 02.16e-2005). WiMax is able to provide broadband wireless connectivity for mobile stations at relatively high data rates.

Due to the fact that WiMax is a relatively new wireless broadband access technology, some smaller service providers may not be able to afford the deployment cost associated with deploying the infrastructure for WiMax. However, such service providers may still desire to provide WiMax access service to their subscriber base via service agreements with WiMax infrastructure owners (who may be different from the service providers).

An issue associated with such an arrangement between WiMax infrastructure owners and a service provider is that the non-WiMax infrastructure used by the service provider may be incompatible with the WiMax infrastructure.

SUMMARY

In general, according to an embodiment, a method of interworking between a first authentication domain and a second authentication domain includes a bridge module performing a first authentication procedure in the first authentication domain for a mobile station, where the first authentication domain is part of a wireless access network. Based on information collected in the first authentication procedure, a second authentication procedure is performed for the mobile station in the second authentication domain, which allows, for example, a service provider to leverage an existing infrastructure (e.g., non-WiMAX infrastructure).

Other or alternative features will become apparent from the following description, from the drawings, and from the claims.

DETAILED DESCRIPTION

In the following description, numerous details are set forth to provide an understanding of some embodiments. However, it will be understood by those skilled in the art that some embodiments may be practiced without these details and that numerous variations or modifications from the described embodiments may be possible.

In accordance with some embodiments, a bridge module is provided to perform interworking between different authentication domains. The different authentication domains include a first authentication domain that is part of a wireless access network. In some embodiments, the wireless access network is a wireless broadband access network, such as a Worldwide Interoperability for Microwave Access (WiMax) access network. A current version of WiMax is defined by the IEEE 802.16 Standard, as amended by 802.16e-2005. Note that the term WiMax can also refer to other versions that are based on the current WiMax technology.

The second authentication domain that is different from the first authentication domain is an authentication domain provided by a service provider that is different from the owner of the WiMax infrastructure making up the first authentication domain. In one example, the WiMax infrastructure can be owned by a WiMax infrastructure wholesaler, which sells WiMax access services associated with its WiMax infrastructure to various service providers, referred to as WiMax retailers. Based on agreements between the WiMax wholesalers and retailers, the WiMax retailers (service providers) are able to provide WiMax access services for subscribers of such service providers even though the service providers use legacy (non-WiMax) infrastructures.

By being able to leverage the WiMax infrastructure of the WiMax wholesaler, the service providers are able to offer WiMax access services to the subscribers of the service providers without going to the expense of deploying WiMax equipment, which can be expensive.

The first authentication domain of the WiMax infrastructure and the second authentication domain of the service provider network may employ authentication procedures that are different (and that are conventionally incompatible). In accordance with some embodiments, a bridge module is provided to enable interworking between the different authentication domains such that WiMax access services can be provided for subscribers of service providers that use legacy equipment.

Figure 1:
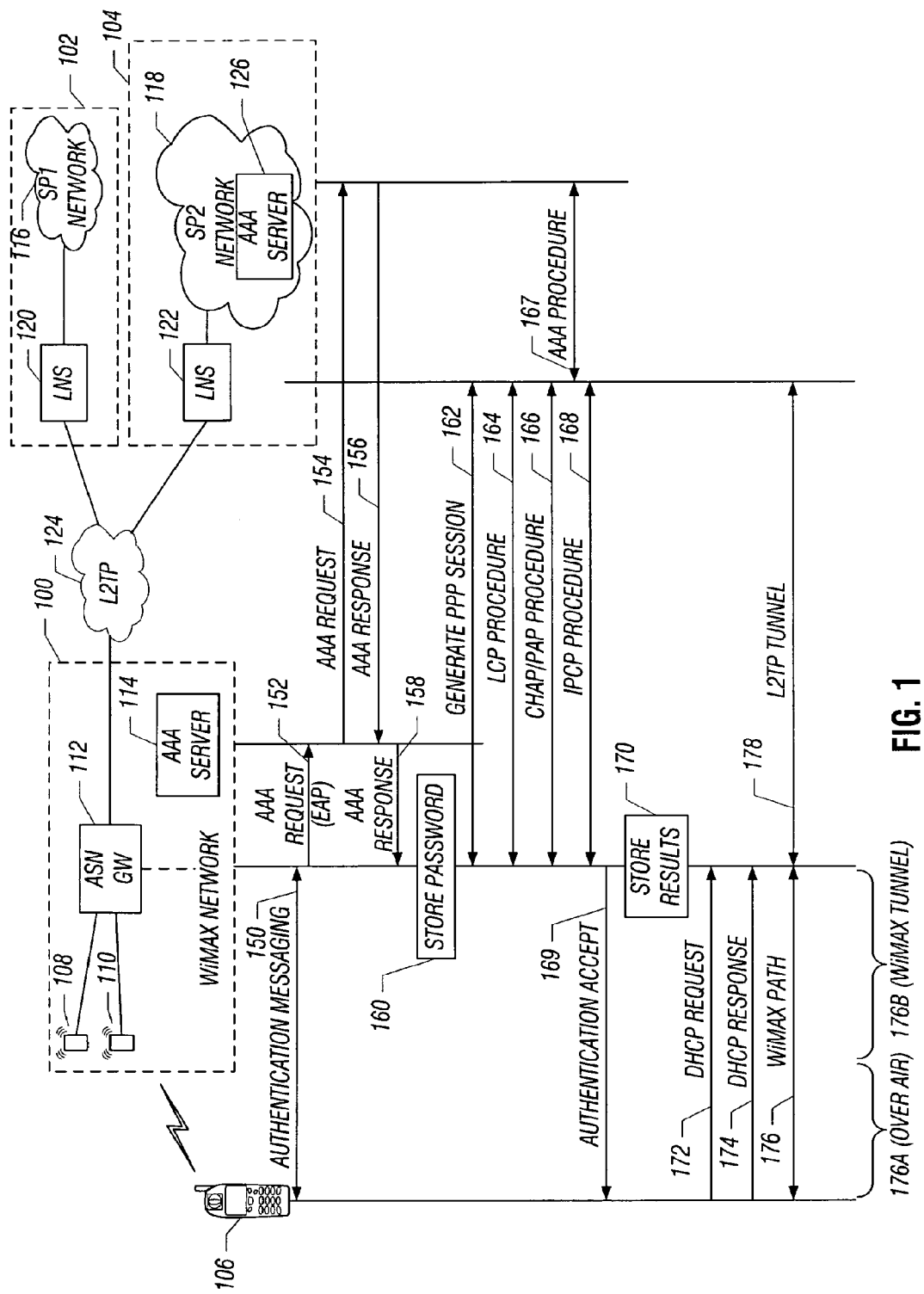
FIG. 1 is a combined block diagram and message flow diagram to illustrate interworking between different authentication domains, in accordance with an embodiment.

FIG. 1 illustrates an example arrangement that includes a first network 100 (e.g., WiMax access network), and service provider systems 102, 104 associated with corresponding service providers. In the ensuing discussion, reference is made to WiMax and other specific protocols used by the various entities depicted in FIG. 1. Note, however, that the scope of the invention is not to be limited to such protocols, and in fact, other embodiments can employ other types of protocols.

The WiMax access network 100 has base stations 108, 110 to enable communication with mobile stations, such as mobile station 106 depicted in FIG. 1. The base stations 108, 110 are connected to an access service network (ASN) gateway 112. The ASN gateway 112 supports connection management and mobility across base stations. Although just two base stations are depicted as being part of the WiMax access network 100, additional base stations may be present in the WiMax access network 100. Also, note that additional ASN gateways may also be present in the WiMax access network 100.

The ASN gateway 112 also includes modules that perform the following: serve as the Extensible Authentication Protocol (EAP) authenticator for subscriber identity; act as a client to AAA (authentication, authorization, accounting) server(s); and other tasks. Authentication allows for a user to be confirmed as a valid user, authorization implements policies that determine which resources and services a user may access, and accounting keeps track of time and data resources used for billing and analysis. An AAA server can operate according to either the RADIUS (Remote Authentication Dial In User Service) protocol, as defined by Request for Comments (RFC) 2865, entitled "Remote Authentication Dial In User Service (RADIUS)," dated June 2000, or by a successor protocol to RADIUS, referred to as Diameter, defined by RFC 3588, entitled "Diameter Base Protocol," dated September 2003.

In addition, according to some embodiments, the ASN gateway 112 also includes a bridge module to perform interworking between two different authentication domains, as noted above.

The separate service provider systems 102, 104 associated with corresponding service providers include service provider networks 116 and 118, respectively. The service provider networks 116, 118 are connected to corresponding tunnel servers 120, 122, which are used for establishing tunnels over a network 124 between the WiMax access network 100 and the service provider systems 102, 104. Although referenced in the singular sense, note that the term "network" can refer to either a single network or a combination of multiple networks (along with any routers and switches in such network(s)). The tunnel server 120 is part of the service provider system 102, and the tunnel server 122 is part of the service provider system 104.

In some embodiments, the tunnel servers 120 and 122 can be L2TP (Layer 2 Tunneling Protocol) network servers (LNS). L2TP is a tunneling protocol used to support virtual private networks (VPNs). One version of L2TP is described in RFC 2661, entitled "Layer 2 Tunneling Protocol 'L2TP'," dated August 1999. A newer version of L2TP is L2TPv3, as described in RFC 3931, entitled "Layer Two Tunneling Protocol-Version 3 (L2TPv3)," dated March 2005. In other implementations, tunneling servers according to other tunneling protocols can be used, such as the Point-to-Point Tunneling Protocol (PPTP).

Tunnels can be established between the ASN gateway 112 and the tunnel servers 120, 122 over the network 124. In some embodiments, such tunnels are L2TP tunnels, although other types of tunnels can be established in other implementations. To be able to establish an L2TP tunnel, the ASN gateway 112 behaves as an L2TP Access Concentrator (LAC), which is the initiator of a tunnel. An LNS (120 or 122) is considered the server that waits for establishment of a tunnel by the LAC.

The service provider systems 102, 104 can also be referred to as VPN systems. The ASN gateway 112 in the WiMax access network 100 is able to establish tunnels with a VPN system to enable communication between a mobile station attached to the WiMax access network 100 and a network node connected to the VPN system. As noted above, the WiMax access network 100 provides a first authentication domain that uses a first authentication procedure. The VPN systems 102, 104, on the other hand, employ a different authentication procedure. The ASN gateway 112, according to some embodiments, includes the bridge module that provides interworking between the different authentication domains.

In the example of FIG. 1, it is assumed that the mobile station 106 is associated with a subscriber of one of the service provider systems 102, 104. Thus, although the service provider system 102 or 104 does not have a WiMax infrastructure, the service provider system 102 or 104 is able to leverage the WiMax access network 100 infrastructure to enable the service provider to provide WiMax access to its subscribers. Note that although the mobile station 106 performs access using the WiMax access network, various subscriber-specific functions are still provided by the corresponding service provider system, including authentication functions and other subscriber-specific functions. Therefore, for the mobile station 106 to be provided access using the WiMax access network 100, the mobile station 106 has to be able to communicate with the backend infrastructure of the service provider system through the WiMax access network 100.

To access the network, the mobile station 106 exchanges messaging (at 150) with the ASN gateway 112. As part of the exchange of messaging at 150, the authenticator in the ASN gateway 112 sends an EAP (Extensible Authentication Protocol) request to the mobile station 106 to request the identity of the mobile station 106. The mobile station, in the exchange of messaging at 150, returns the mobile station's identity using an EAP response message. EAP defines an authentication framework. One version of EAP is described in RFC 3748, entitled "Extensible Authentication Protocol (EAP)," dated June 2004. In other embodiments, other types of authentication frameworks can be used.

An AAA client in the ASN gateway 112 then initiates authentication by sending (at 152) an AAA request message to an AAA server 114 that is part of the WiMax access network 100. The AAA request message can be a RADIUS message or Diameter message. The AAA request message can contain an EAP request. The AAA server 114 can act as a proxy to forward the AAA request message (at 154) to an AAA server 126 that is associated with the service provider system. In this example, the AAA server 114 has determined that the mobile station 106's identity is associated with service provider network 104. The AAA message sent at 154 contains the identity of the mobile station 106.

Once the AAA server 126 authenticates the mobile station 106, the AAA server 126 returns (at 156) an AAA response message (that contains an EAP response) to the AAA server 114, which in turns forwards the AAA response message (at 158) to the ASN gateway 112. The AAA response message contains an encrypted password or key (or any other credential), which can be contained in a vendor-specific AAA attribute, for example. Alternatively, the encrypted password, key, or other credential can be contained in other WiMax AAA attributes. Note that the credential is expected to have been previously provisioned in the AAA server 126 when the subscriber account was originally created. The password or other credential is stored (at 160) in the ASN gateway 112 for later use.

The messages exchanged at 150, 152, 154, 156, and 158 are part of the WiMax authentication procedure (authentication procedure used in the WiMax authentication domain). Note, however, that the inclusion of the encrypted password or key (or other credential) is provided according to some embodiments.

Next, the ASN gateway 112 (acting as an LAC, for example) performs interworking with the tunnel server 120 or 122 (e.g., LNS) in the service provider system to establish a tunnel (e.g., L2TP tunnel) between the ASN gateway 112 and the tunnel server. In this example, it is LNS 122 of service provider network 104 that performs interworking with the ASN gateway 112, since the mobile station's identity has been determined to be associated with the service provider network 104. Alternatively, for reduced overhead, an L2TP tunnel may have been pre-established. The ASN gateway 112 then establishes a new PPP (Point-to-Point) session within the pre-established tunnel on behalf of the mobile station 106. Note that the ASN gateway 112 may establish multiple PPP sessions in this tunnel, where each PPP session is on behalf of an individual mobile station that is determined to be associated with the service provider network at the other end of this tunnel.

The following is an example authentication procedure performed in the second authentication domain, which is the domain associated with the service provider system. The authentication procedure for the second authentication domain causes creation of a tunnel (e.g., L2TP tunnel) between the ASN gateway 112 and the tunnel server.

In a first phase of this authentication procedure, the ASN gateway builds (at 162) a PPP session over the network 124 with the tunnel server (e.g., LNS). The ASN gateway can specify a particular protocol to use, such as either CHAP (Challenge Handshake Authentication Protocol) or PAP (Password Authentication Protocol), for example. Note that since the mobile station 106 may not support PPP, the ASN gateway 112 establishes the PPP session on behalf of the mobile station.

Another phase of the authentication procedure is a Link Control Protocol (LCP) procedure (performed at 164), which uses either CHAP or PAP messaging to perform authentication of the mobile station. The CHAP or PAP messaging that is sent from the ASN gateway to the LNS contains the encrypted password, key, or other credential that was returned in the AAA response (158) received by the ASN gateway 112 in the first authentication procedure of the WiMax authentication domain. In response to the AAA encrypted password, key, or other credential received at the LNS, the LNS performs (at 167) an AAA procedure with the AAA server 126 using PAP or CHAP.

Next, an IPCP (Internet Protocol Control Protocol) procedure is performed (at 168) to provide address assignment for the mobile station 106, in which the LNS notifies the ASN gateway to use a particular IP address for the mobile station 106.

At some point after authentication of the mobile station in the service provider domain, the ASN gateway 112 sends an authentication accept message (at 169) to the mobile station.

The IP address (and other information) received by the ASN gateway 112 as part of the IPCP procedure (168) is stored (at 170) in the ASN gateway. The stored IP address can be used to provide IP address information (along with other parameters) to the mobile station 106 as part of a DHCP (Dynamic Host Configuration Protocol) procedure, in which the mobile station 106 sends (at 172) a DHCP request to the ASN gateway 112. The DHCP request is used by a client, such as the mobile station 106, to obtain various parameters (including an IP address) necessary for the client to operate in an IP network.

In response to the DHCP request, the ASN gateway 112 (acting as a DHCP proxy) sends (at 174) a DHCP response to the mobile station 106, in which the DHCP response contains the results (including the IP address provided by the LNS) of the IPCP procedure of 170.

At this point, a WiMax data path is established (at 176) between the mobile station 106 and the ASN gateway 112, and an L2TP tunnel is established (at 178) between the ASN gateway 112 and the LNS. Bearer traffic is communicated through the WiMax data path and L2TP tunnel. Note that accounting messages can also be communicated from the ASN gateway 112 to the AAA server 114, which can proxy the accounting messages to the AAA server 126 associated with the service provider system.

In some implementations, the WiMax data path 176 established between the mobile station 106 and the ASN gateway 112 includes an over-the-air portion 176A between the mobile station 106 and a base station 108 or 110, and a WiMax tunnel (e.g., generic routing encapsulation or GRE tunnel) 176B between the base station and ASN gateway. In the GRE tunnel, user traffic is tunneled between the base station and the ASN gateway.

In addition, user traffic is also tunneled through the L2TP tunnel 178 between the ASN gateway and the LNS. The LNS is able to provide appropriate traffic treatment for the subscriber's subscription profile.

In the direction from the L2TP tunnel to the GRE tunnel, the ASN gateway 112 is able to perform classification of user traffic. Effectively, the ASN gateway 112 is able to classify user traffic to different service flows. One form of classification can be based on the DSCP (Differentiated Services Code Point) field value of an IP packet that may have been marked by the network elements in the upstream service provider's network. DSCP values are contained in DSCP fields of IP packets to enable IP packets to be associated with different service classes. Based on the DSCP value, a packet can be routed to the appropriate service flow in the GRE tunnel.

Figure 2:
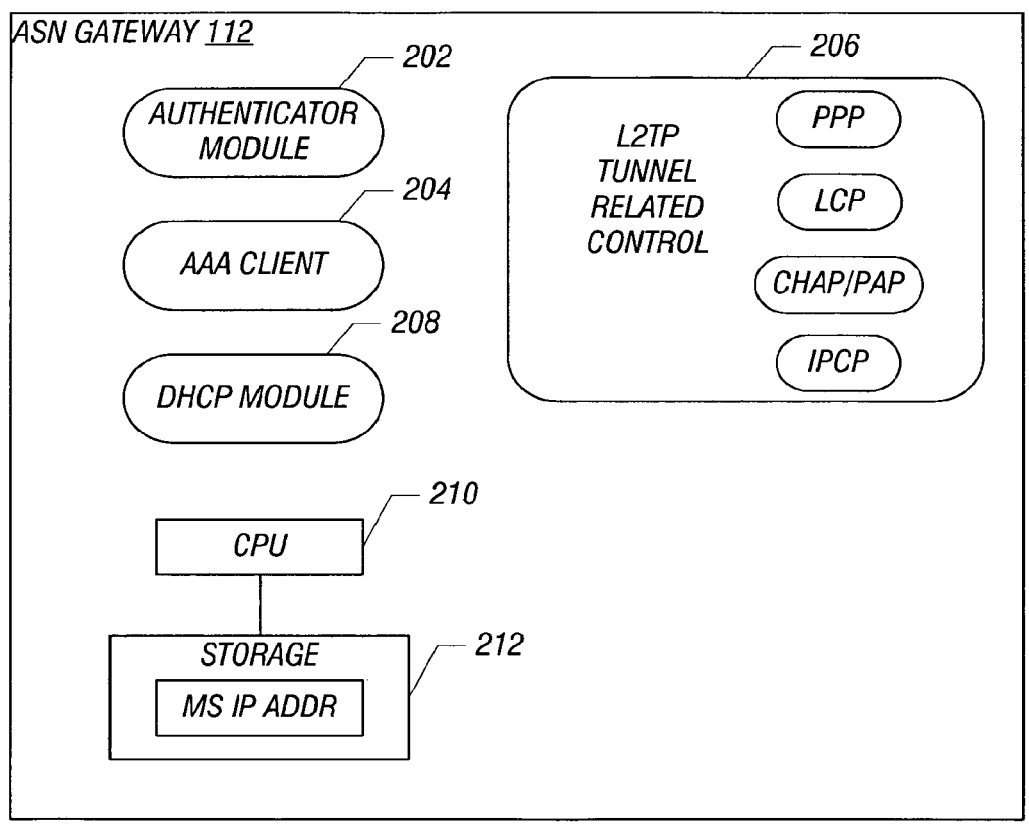
FIG. 2 is a block diagram of components of an access service network (ASN) gateway to provide interworking between different authentication domains, in accordance with an embodiment.

Example components of the ASN gateway 112 are depicted in FIG. 2. The ASN gateway 112, which can be implemented as a computer system, for example, includes an authenticator module 202, which performs an authentication procedure with the mobile station 106. Note also that the authenticator module 202 also stores the password or other credential (task 160 in FIG. 1). In addition, the ASN gateway 112 includes an AAA client 204 to perform an AAA procedure with the AAA server 114 of the WiMax authentication domain.

The ASN gateway 112 also includes an L2TP tunnel-related control module 206 to perform the procedures 162, 164, 166, and 170. The L2TP tunnel-related control module 206 includes sub-modules such as PPP, LCP, CHAP or PAP, and IPCP sub-modules.

The ASN gateway 112 also includes a DHCP module 208 to perform the DHCP procedure 172, 174 depicted in FIG. 1. The various modules 202, 204, 206, and 208 can be software modules that are executable on one or more central processing units (CPUs) 210, which is connected to a storage 212. The storage 212 can be used to store the IP address of the mobile station returned by the LNS, as described above. This IP address can be provided back to the mobile station as part of a DHCP procedure, for example.

Instructions of the various software modules discussed above are executed on a processor (e.g., CPU 210). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of interworking between a first authentication domain and a second authentication domain, comprising:
   performing, by a bridge module, a first authentication procedure for a mobile station with a wireless access network, wherein the first authentication procedure comprises communicating authentication messaging between the wireless access network and an authentication node in a service provider network, wherein the mobile station is associated with a subscriber of the service provider network, wherein the communicating authentication messaging includes communicating a credential from the service provider network to the wireless access network, and wherein the first authentication procedure establishes authentication of the mobile station by the wireless access network; and
   performing, by the bridge module, a second authentication procedure for the mobile station with the service provider, wherein the second authentication procedure comprises communicating, from the wireless access network, the credential received during the first authentication procedure to the service provider network, and wherein the second authentication procedure establishes authentication of the mobile station by the service provider network.

2. The method of claim 1, wherein the wireless access network comprises a Worldwide Interoperability for Microwave Access (WiMax) access network.

3. The method of claim 2, further comprising establishing a virtual private network (VPN) tunnel between the bridge module and a network server of the service provider network.

4. The method of claim 3, wherein establishing the VPN tunnel comprises establishing a Layer 2 Tunneling Protocol (L2TP) or a Point-to-Point Tunneling Protocol (PPTP) tunnel.

5. The method of claim 2, wherein the first and second authentication procedures are performed by the bridge module in a WiMax access service network (ASN) gateway.

6. The method of claim 5, further comprising:
   establishing, in a role of the ASN gateway as an L2TP access concentrator, an L2TP tunnel between the ASN gateway and an L2TP network server, wherein the L2TP network server is associated with the service provider network.

7. The method of claim 1, wherein the authentication node comprises an Authentication, Authorization, and Accounting (AAA) server, and wherein said performing the first authentication procedure comprises receiving the credential in a AAA response message from the AAA server.

8. The method of claim 1, further comprising receiving an Internet Protocol (IP) address to assign the mobile station as part of the second authentication procedure.

9. The method of claim 8, further comprising communicating the IP address to the mobile station to allocate the IP address to the mobile station.

10. The method of claim 9, wherein communicating the IP address to the mobile station is part of a Dynamic Host Configuration Protocol (DHCP) procedure preformed between a gateway and the mobile station, wherein the gateway includes the bridge module.

11. The method of claim 1, further comprising:
    initiating establishment of a tunnel by a tunnel server of the service provider network.

12. A gateway to provide interworking between first and second authentication domains, comprising:
    communication circuitry for performing network communication;
    a processor, coupled to the communication circuitry, wherein the processor is configured to:
      perform a first authentication procedure for a mobile station with a wireless access network, wherein the first authentication procedure comprises communicating authentication messaging between the wireless access network and an authentication node in a service provider network, wherein the mobile station is associated with a subscriber of the service provider network, wherein the communicating authentication messaging includes communicating a credential from the service provider network to the wireless access network, and wherein the first authentication procedure establishes authentication of the mobile station by the wireless access network;
      perform a second, different authentication procedure for the mobile station with the service provider network, wherein the second authentication procedure comprises communicating, from the wireless access network, the credential received during the first authentication procedure to the service provider network, and wherein the second authentication procedure establishes authentication of the mobile station by the service provider network.

13. The gateway of claim 12, wherein the processor performs the second authentication procedure with an L2TP network server that is part of the service provider network.

14. The gateway of claim 12, wherein the wireless access network comprises a Worldwide Interoperability for Microwave Access (WiMax) access network, wherein the WiMax access network is associated with a WiMax wholesaler, and wherein the service provider network is associated with a WiMax retailer that does not own WiMax infrastructure.

15. The gateway of claim 12, wherein the first authentication procedure is performed between the gateway and the authentication node that comprises an Authentication, Authorization, and Accounting (AAA) server, and wherein the second authentication procedure is performed between the gateway and a network server of the service provider network.

16. The gateway of claim 12, further comprising:
    a storage to store an Internet Protocol (IP) address of the mobile station, wherein the IP address is received as part of the second authentication procedure,
    wherein the processor is configured to communicate the IP address to the mobile station as part of a configuration exchange.

17. The gateway of claim 16, wherein the configuration exchange comprises a Dynamic Host Configuration Protocol exchange.

18. The gateway of claim 12, wherein the credential comprises an encrypted credential.

19. The gateway of claim 12, wherein the processor is further configured to:

initiate establishment of a tunnel by a tunnel service of the service provider network.

20. A non-transitory, computer-readable storage medium storing program instructions executable by a processor to:

perform a first authentication procedure for a mobile station with a wireless access network, wherein the first authentication procedure comprises communicating authentication messaging between the wireless access network and an authentication node in a service provider network, wherein the mobile station is associated with a subscriber of the service provider network, wherein the communicating authentication messaging includes communicating a credential from the service provider network to the wireless access network, and wherein the first authentication procedure establishes authentication of the mobile station by the wireless access network; and perform, by the bridge module, a second authentication procedure for the mobile station with the service provider, wherein the second authentication procedure comprises communicating, from the wireless access network, the credential received during the first authentication procedure to the service provider network, and wherein the second authentication procedure establishes authentication of the mobile station by the service provider network.

21. The non-transitory, computer-readable storage medium of claim 20, wherein the wireless access network infrastructure comprises a WiMax access network infrastructure.

\* \* \* \* \*